United States Patent [19]

Zindler et al.

[11] 3,796,239

[45] Mar. 12, 1974

[54] DISPENSER SYSTEM

[75] Inventors: Jerrold Zindler, Cambridge;
Norman F. F. J. Rolfe, Wakefield, both of Mass.

[73] Assignee: Instrumentation Laboratory, Inc., Lexington, Mass.

[22] Filed: July 22, 1971

[21] Appl. No.: 165,011

[52] U.S. Cl............. 141/83, 23/259, 83/71, 141/94, 141/98, 141/192
[51] Int. Cl.... B65b 3/30, B65b 57/18, B65b 57/20, B01j 4/02, B26d 5/34
[58] Field of Search ............... 141/83, 94, 98, 192; 23/230 A, 253 A, 259; 83/71

[56] References Cited
UNITED STATES PATENTS

| | | | |
|---|---|---|---|
| 3,555,284 | 1/1971 | Anderson | 23/253 A |
| 3,653,835 | 4/1972 | Brandel | 23/230 A |
| 1,172,058 | 2/1916 | Scheyer | 83/71 |
| 1,241,269 | 9/1917 | Wurts | 83/71 |
| 3,187,786 | 6/1965 | Hrdina | 141/94 |
| 3,232,506 | 2/1966 | Rabinow | 83/71 X |
| 3,589,867 | 6/1971 | Heinz | 141/94 X |
| 3,649,203 | 3/1972 | Schneider | 23/253 A |
| 2,604,249 | 7/1952 | Gorham | 141/192 X |
| 3,508,879 | 4/1970 | Findl | 141/192 X |
| 3,648,741 | 3/1972 | Croasdale | 141/9 |
| 3,688,085 | 8/1972 | Tetar | 141/192 X |

*Primary Examiner*—Wayne A. Morse, Jr.
*Attorney, Agent, or Firm*—Willis M. Ertman

[57] ABSTRACT

A dispenser system for introducing a precise amount of material to be analyzed into a container includes a sample chamber, and apparatus for storing material in the sample chamber. A data record is associated with the container and operation of the storage apparatus is controlled in response to the data record to store a precise amount of material in the chamber which is then transferred to the container for analysis.

14 Claims, 9 Drawing Figures

PATENTED MAR 12 1974
3,796,239
SHEET 2 OF 4
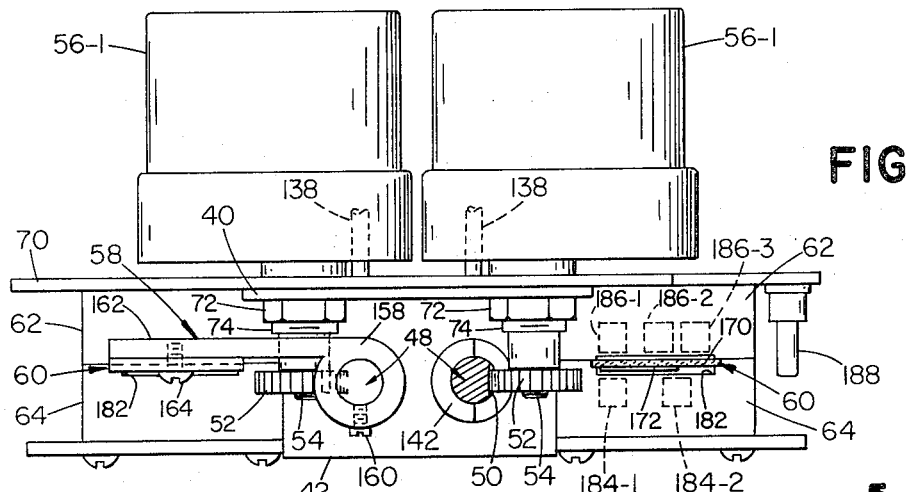
FIG 3
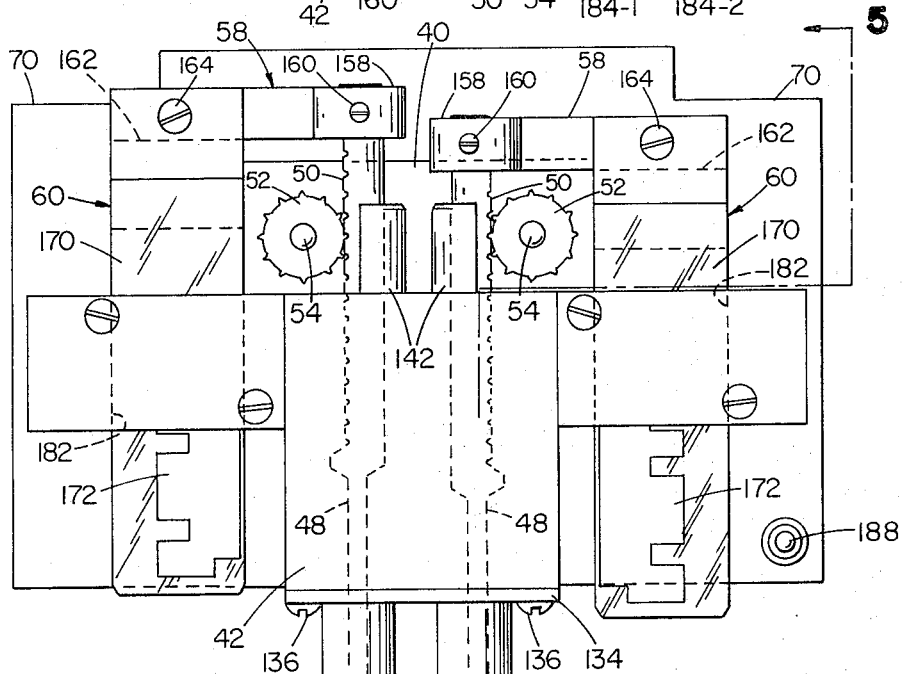
FIG 4
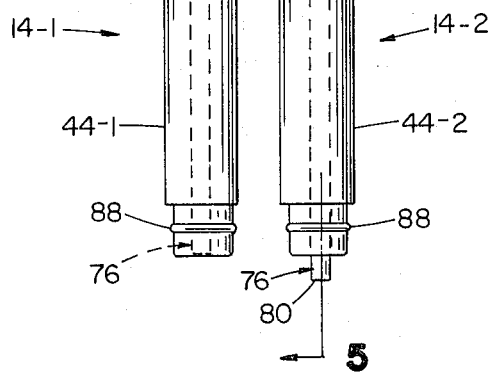

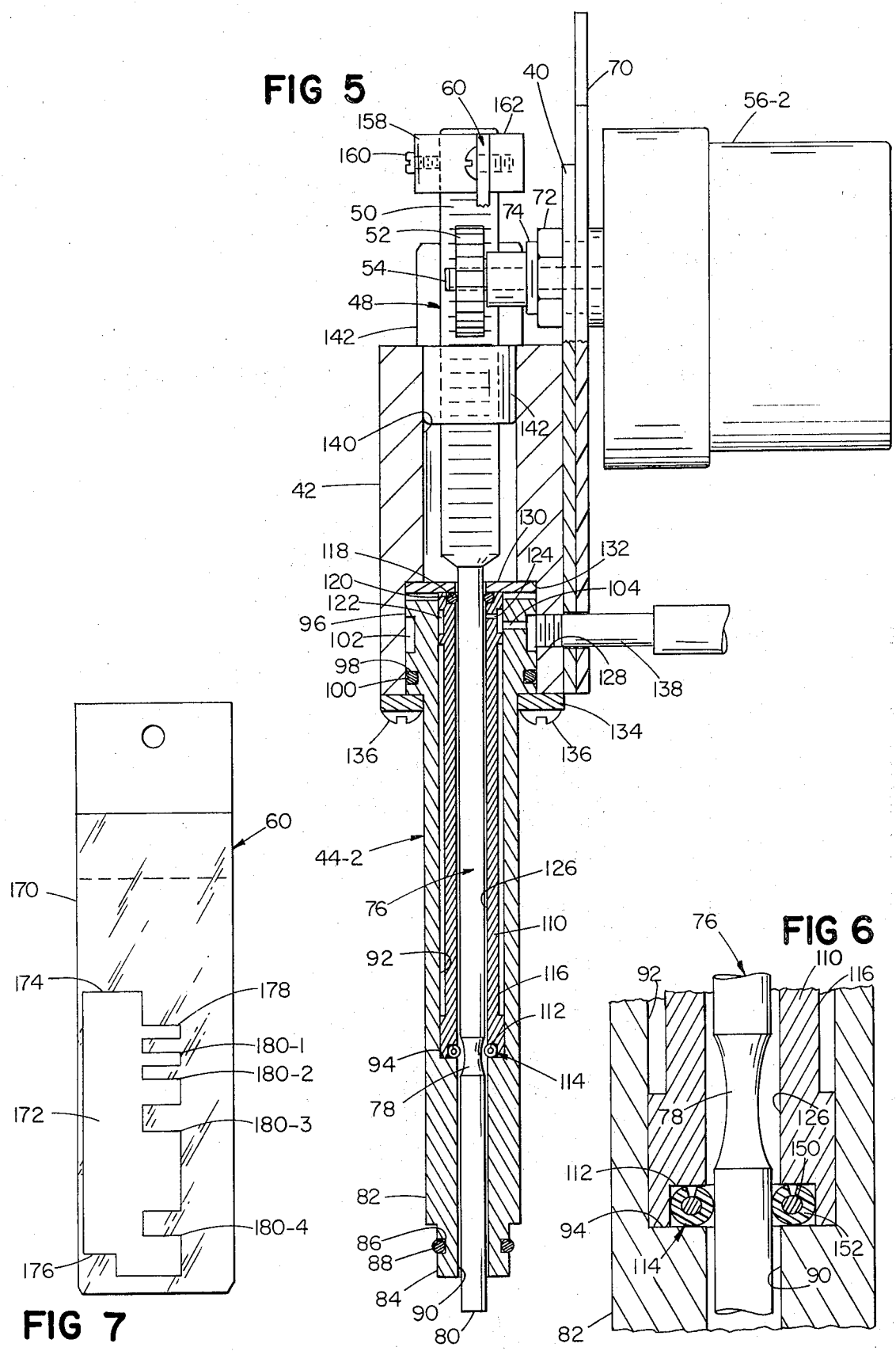

DISPENSER SYSTEM

SUMMARY OF INVENTION

This invention relates to dispenser systems and more particularly for systems particularly adapted for dispensing minute quantities of materials in accurate amounts.

It is frequently necessary to provide a precise amount of a known or unknown material for use in connection with a chemical analysis. In photometric analyses, for example, measurements may be made directly, by comparison with a standard, or as a function of the rate of chemical change. Such techniques are frequently employed in the analysis of precious fluids such as blood or other body fluids. For example, a chemical analysis of a sample of such a fluid for enzymes, hemoglobin, chloresterol, glucose, etc., provides useful diagnostic information. While laboratory services performing such analyses are available, the use of such services often entails the delay of several days or more before analysis information is available. Accordingly a need exists in this field for instrumentation that provides accurate chemical analysis data and that can be operated by untrained personnel. Such instrumentation would assist laboratories in contending with the shortage of skilled personnel. As an adjunct to the performance of such analyses, however, it is necessary to provide a system for measuring out quantities of particular materials to be employed in the chemical analysis in precise amounts, and it is an object of this invention to provide novel and improved apparatus for this purpose.

Another object of the invention is to provide novel and improved apparatus and systems for the accurate dispensing of different and minute amounts of materials.

Another object of the invention is to provide novel and improved dispensing systems which are easy to operate and which a variety of different amounts may be easily selected by an untrained operator.

In accordance with the invention there is provided a dispenser system for introducing a precise amount of a material to be analyzed into a container comprising: a sample chamber, apparatus for storing material in the chamber, a data record associated with the container, means responsive to the data record for controlling the material storage apparatus to store a precise amount of material in the chamber, and means to transfer the precise amount of material from the chamber to the container for analysis.

In a particular embodiment the material storage apparatus comprises a housing which includes a bore and chamber for holding a sample. A movable member is mounted for reciprocation in the housing. A reversible drive motor moves the member away from the chamber to aspirate material into the chamber and towards the chamber to dispense the material. A flag member that has a series of regions of alternating optical characteristics is coupled to and movable with the member. Photoelectric means senses the flag regions and produces output signals as a function of the movement of the flag member. An operational amplifier is coupled between the photoelectric means and a counter and generates a counter stepping signal on each sensed predetermined optical value at the transition between adjacent regions and the counter setting is compared with signals from the data record for controlling aspiration of the sample into the chamber. The flag member also includes upper and lower travel limit portions and a photocell senses these travel limit portions. In response to detection of one of the travel limit portions by the photocell, the direction of movement of the movable member is automatically reversed. While in response to detection of a second travel limit portion during a dispense cycle a blower is actuated for a predetermined interval of time and then the direction of movement of said member is reversed to return said member to its starting position.

A preferred embodiment of the invention is employed in photometric analysis instrumentation for performing chemical analyses on precious fluids such as blood to provide medically useful diagnostic information, and is designed to dispense material in quantities of 25, 50, 100, or 200 microliters to an accuracy of ±1 percent under the control of a card reader, with a card containing data correlated with material to be dispensed into a container for use in a photometric analysis of the resulting mixture of materials.

Other objects, features and advantages of the invention will be seen as the following description of a particular embodiment progresses, in conjunction with the drawings, in which:

FIG. 3 is a top view, with parts broken away, of the dispensing apparatus shown in FIG. 2;

FIG. 4 is a front elevational view of the dispensing apparatus shown in FIG. 3;

FIG. 5 is a sectional view of the dispensing apparatus taken along the line 5—5 of FIG. 4;

FIG. 6 is an enlarged view of a portion of the dispensing apparatus showing details of the valve means included therein;

FIG. 7 is an enlarged view of flag structure employed in the dispensing apparatus;

DESCRIPTION OF PARTICULAR EMBODIMENT

Figure 1:
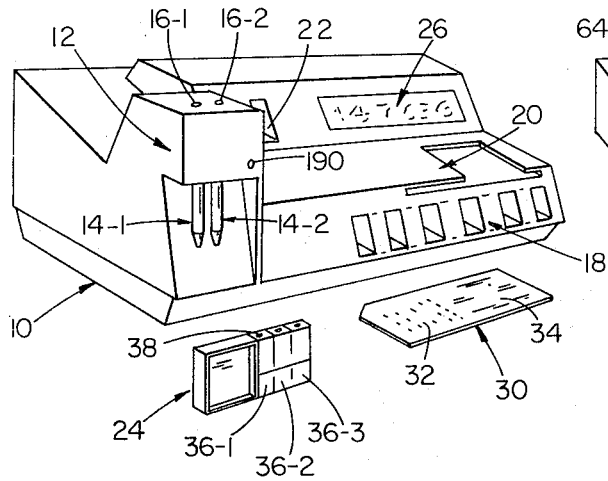
FIG. 1 is a perspective view of components of a biochemical analysis system incorporating a dispensing system in accordance with the invention.

With reference to FIG. 1, there is shown a biochemical analysis instrument that includes a housing 10 on which is mounted a dispenser unit 12 that has two dispensing sections 14-1 and 14-2 and corresponding dispenser control switches 16-1 and 16-2. To the right of the dispenser unit 12 is an incubator section 18 and above section 18 is a card receiving slot of card reader unit 20. Above and to the rear of the card reader unit 20 is a photometer section that includes a port 22 for receiving a cuvette assembly 24 and a digital photometer output display 26. Used with this instrument is the cuvette assembly 24 and a card 30 that includes a data section 32, having photometer calibrating and control information and dispenser control information correlated with material in that cuvette assembly, and an instruction section 34.

The cuvette assembly 24 includes three sample chambers 36-1, 36-2 and 36-3 of 5 milliliters volume each. Each chamber has two spaced side walls with parallel optical windows therein and is constructed of high quality optical material, the material employed in a preferred embodiment being a transparent TPX methyl pentane polyolefin plastic. A port 38 in the upper wall of each chamber is sealed by a frangible section which may be broken away to permit introduction of material into the corresponding sample chamber 36.

Figure 2:
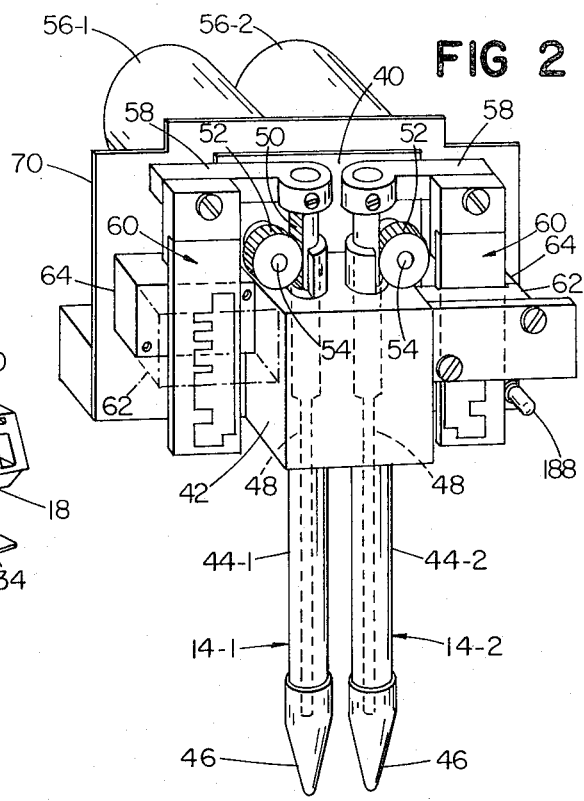
FIG. 2 is a perspective view, with components removed, of dispensing apparatus employed in the system shown in FIG. 1.

Additional details of the dispenser may be seen with reference to FIG. 2 which shows components of the dispenser as exposed when the cover is removed. The dispenser includes a support plate 40 on which is disposed a support body 42. Depending from body 42 are tubular housing members 44-1, 44-2 each of which has a replaceable conical chamber member 46 secured at its lower end. Disposed for reciprocating movement within each member 44 is a shaft 48 which at its upper end has formed on it a rack gear portion 50 that is engaged by pinion gear 52. Gear 52 is in turn mounted on a shaft 54 driven by reversible motor 56. Secured at the top of each shaft 48 is a laterally extending arm 58 which carries a depending flag or index member 60. That index member is disposed in a slot defined between a front member 62 that houses two light sources and a rear member 64 that houses three light sensors. Signals produced by the sensors as a function of movement of the flag or index member 60 are employed to control the operation of the dispenser apparatus.

Additional details of the dispenser apparatus may be seen with reference to FIGS. 3–7. As shown in those figures, the apparatus includes support plate 40 and a printed circuit board 70 which carries circuit components for the control of the dispenser apparatus. Board 70 is clamped to support plate 40 by suitable fastenings including nut 72 which engages housing 74 of motor shaft 54. Pinion gear 52 is mounted on shaft 54 and engages rack gear 50. As best seen with reference to FIG. 5, movable shaft member 48 is a cylinder, one-eighth inch in diameter in this embodiment. A toroidal groove 78, 0.020 inch in maximum depth and 0.125 inch in length is formed in cylindrical portion 76 adjacent tip 80.

The cylindrical portion 76 is mounted within housing assembly 44 which includes an outer member 82 having an end portion 84 of reduced diameter with a groove 86 in it in which an 0-ring 88 is secured. A bore 90 is formed in the lower portion of member 82 and a second bore 92 of larger diameter is formed in the upper portion, the transition between the two bores being defined by shoulder 94. Member 82 has an enlarged head portion 96 in the outer surface of which is formed annular groove 98 in which is disposed a sealing 0-ring 100 and annular manifold groove 102 which has a radial passage 104 communicating therewith.

Insert member 110 is disposed within bore 92 and includes an internal groove 112 at its lower end in which a seal member 114 is disposed, an annular recess 116 in its outer surface that extends its length, an internal groove 118 at its upper end which receives seal ring 120, an annular manifold groove 122 and a radial passage 124 that communicates with groove 122. The inner bore 126 of member 110 is of the same diameter as bore 90. A retaining plate 130 is seated in shoulder 132 formed in the interior of support member 42 and the assembly of members 82 and 110 is in turn seated on plate 130 and secured to support member 42 by clamp plate 134 and bolts 136. Support member 42 has a port 128 in its rear wall in which conduit 138 is threadedly received. At the upper end of member 42 is a port 140 in which a bushing 142 is disposed to provide a guide for the upper end of member 48.

Additional details of the valve structure that is formed by seal member 114 and recess 78 may be seen with reference to FIG. 6. Seal member 114 includes an annular resilient core member 150 and a split toroidal collar member 152 of polytetrafluoroethylene which provides a resilient, low friction seal surface against the cylindrical wall surface of shaft 76. In the position shown in FIG. 6, the valve members function to close the passageway formed by bore 126 of member 110 from bore 90 of outer member 82. When the shaft 76 is moved downwardly to the position shown in FIG. 5, the valve is opened. In this position, air under pressure supplied by a blower connected to conduit 138 is applied through manifold groove 102, radial passage 104, manifold groove 120 and passage 122 to bore 120 for flow down past recess 78 through bore 90 to the conical chamber 46 secured by O-ring 88 on the lower end of member 82 to increase the pressure in that chamber to supplement the action of plunger 76 in discharging material through the port at the tip of the conical chamber 46.

The arm member 58 that is secured at the upper end of plunger member 48 (as best seen in FIG. 3) includes a head portion 188 that is disposed over the end of member 48 and is secured with set screw 160. Its laterally extending arm portion 162 has index member 60 secured to it by bolt 164. Additional details of index member 60 may be seen with reference to FIG. 7. Each index member includes a glass substrate 170 that is 2.27 inches in length and 0.75 inch in width. An opaque flag marking 172 is formed on substrate 174. The lefthand section of flag marking 172 includes a lower travel limit reference 174 and an upper travel limit reference 176. The righthand section of the flag marking 172 includes a datum or reference mark 178 and four parallel signal marks 180-1 - 180-4. Mark 180-1 is spaced 0.137 inch from datum mark 178; mark 180-2 is spaced 0.265 inch; mark 180-3 is spaced 0.521 inch; and mark 180-4 is spaced 1.032 inch from the datum mark 178 corresponding to 25, 50, 100, and 200 microliters, respectively.

Each index member 60 extends downwardly from support arm 162 and passes through the guide passage 182 between light source housing member 62 and sensor housing member 64. As will be seen with reference to FIG. 3, light source 184-1 is aligned with sensor 186-1 and arranged so that the lefthand section of the flag marking 172 is interposed between that source 184-1 and sensor 186-1. The second source 184-2 is aligned with the right vertical edge of the flag marking so that the righthand portion of the flag marking is interposed between source 184-2 and sensor 186-2 while sensor 186-3 is disposed for uninterrupted viewing of source 184-2 and functions as a reference sensor. A lamp 188 mounted on support 70 is visible through aperture 190 (FIG. 1) in the cover housing of the dispenser apparatus.

Figure 8:
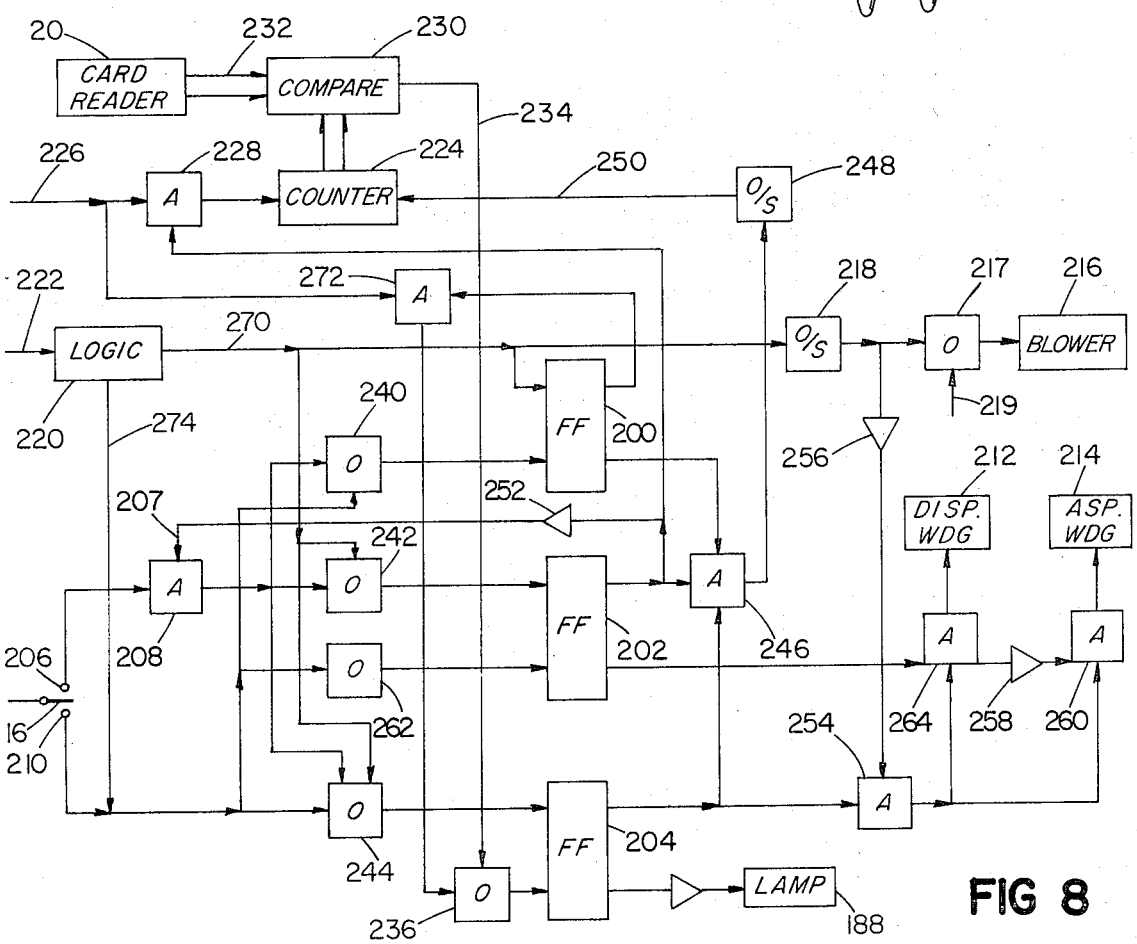
FIG. 8 is a block diagram of logic circuitry employed in the dispensing system.

A better understanding of the operation of the dispenser system may be had with reference to FIG. 8. That control logic responds to the operation of switch 16, the operation of which controls three flip flops, a flag flip flop 200, a direction control flip flop 202 and a motor power control flip flop 204. Switch 16 is a two position switch which, when moved to engage upper contact 206, generates an aspirate signal (providing that the system is not in aspirate mode as indicated by a conditioning signal on line 207 of AND circuit 208) that clears the flag flip flop 202, sets the motor direction flip flop 202 and sets the motor power flip flop 204 (this setting of flip flops 200, 202 and 204 establishes the aspirate mode). When switch 16 is moved to engage lower contact 210, a dispense signal clears flip flops 200 and 202 and sets flip flop 204 establishing system dispense mode. The outputs of flip flops 202 and 204 control the energization of dispense winding 212 of motor 56 and aspirate winding 214 of that motor. Blower motor 216 is energized in response to the output of one shot circuit 218 (through OR circuit 217 which has a second input over line 219 from the other dispenser) which in turn is triggered by a lower travel limit signal from logic 220 which responds to signals from photocell 186-1, applied over line 222. The logic also includes a counter 224 which is stepped by signals from sensing photocells 186-2 and 186-3 over line 226 when the system is in aspirate mode as indicated by conditioned AND circuit 228; and a compare circuit 230 which compares the output of counter 224 with signals from card reader 20 over line 232. The output of compare circuit 230 over line 234 clears flip flop 204 via OR circuit 236.

Placing switch 16 in the aspirate position completes a circuit to contact 206 and through OR circuit 240 clears flip flop 200 through OR circuit 242 sets flip flop 202 and through OR circuit 244 sets flip flop 204. The resulting three outputs cause AND circuit 246 to produce an output that is applied to one shot 248 and that circuit in turn produces an output of 100 milliseconds duration over line 250 to reset counter 224. The set flip flop 202 also applies conditioning level to AND circuit 228 and through inverter 252 removes a conditioning level from AND circuit 208. The output of flip flop 204 conditions AND circuit 254 and as one shot 218 is not producing an output, inverter 256 provides a second conditioning to AND circuit 254 and the resulting output causes AND circuit 260 (conditioned by the output of inverter 258) to energize the aspirate winding 214 of motor 56. The setting of motor flip flop 204 also energizes lamp 188. The energization winding 214 of motor 56 starts raising shaft 48 from the datum reference point (indicated by the edge 178 disposed between source 184-2 and sensor 186-2), and this upward movement of shaft 48 draws material from a supply through the port at the end of the sample tip 46 into the sample chamber 46. The index member 60 moves with the aspirating member 48 and that movement is sensed by the light source-photocell combination. Each transition from light to dark produces a pulse on line 226 which is passed by AND circuit 228 to step counter 224. Digital signals from card reader 20 are applied over lines 232 to compare circuit 230 and when the setting of counter 224 is the same as the card reader digital signals on lines 232, the compare circuit 230 produces an output over line 234 to clear flip flop 204 and de-energize winding 214 and lamp 188. Thus, drive motor 56 is stopped and a precise amount of material as determined by the signals from card reader 20 is stored in the chamber defined by the sample tip 46.

The supply of material is then removed from beneath tip 46, and after its frangible port 38 has been opened, the appropriate chamber 36 of the cuvette 24 to be filled is placed under the dispenser. The control switch 16 is then moved to dispense position completing electrical circuit to contact 210 which is passed through OR circuit 240 to clear flip flop 200 through OR circuit 262 to clear flip flop 202 and through OR circuit 244 to set flip flop 204. The resulting output signals are applied to condition AND circuit 264 and its output in turn energizes dispense winding 212 so that motor 56 drives shaft 48 in the dispense direction. Signals on line 226 are blocked from application to counter 224 by the removal of conditioning signal from AND circuit 228 upon the clearing of flip flop 202.

When the lower travel limit (edge 174) is reached, the signals from sensor 186-1 on line 222 and from sensors 186-2 and 186-3 on line 226 causes logic 220 to generate an output on line 270 which sets flip flops 200, 202 and 204. The signal on line 270 also triggers one shot 218 to generate an output of two seconds duration to energize blower motor 216 and apply air pressure to conduit 138. At this time, shaft 48 is in the position shown in FIG. 5, the valve defined by groove 78 and seal member 114 being opened and positive pressure is applied through the space between bore 90 and shaft 48 to chamber 46 to dispense any material remaining in that sample tip. The output of one shot circuit 116 also removed conditioning level from AND circuit 254 via inverter 256 and thus removes the conditioning signal applied to AND circuits 260 and 264 so that the shaft member 48 remains in this position while blower 216 is operating. However, the motor control circuitry is conditioned so that on termination of the output from one shot circuit 218, winding 214 is energized to move shaft member 48 upward. As the flip flop 200 is set, conditioning AND circuit 272, the first transition signal on line 226 is passed by the conditioned AND circuit 272 to clear flip flop 204 and stop motor 56 with datum reference 178 aligned with the light source-photocell sensor. Thus the dispenser has been reset to its datum or initial starting point from which the next aspirate sequence will be initiated.

If for any reason, the upper travel limit 176 should be sensed, logic 220 generates a signal on line 274 to initiate a dispense sequence automatically and discharge material from sample tip 46.

Figure 9:
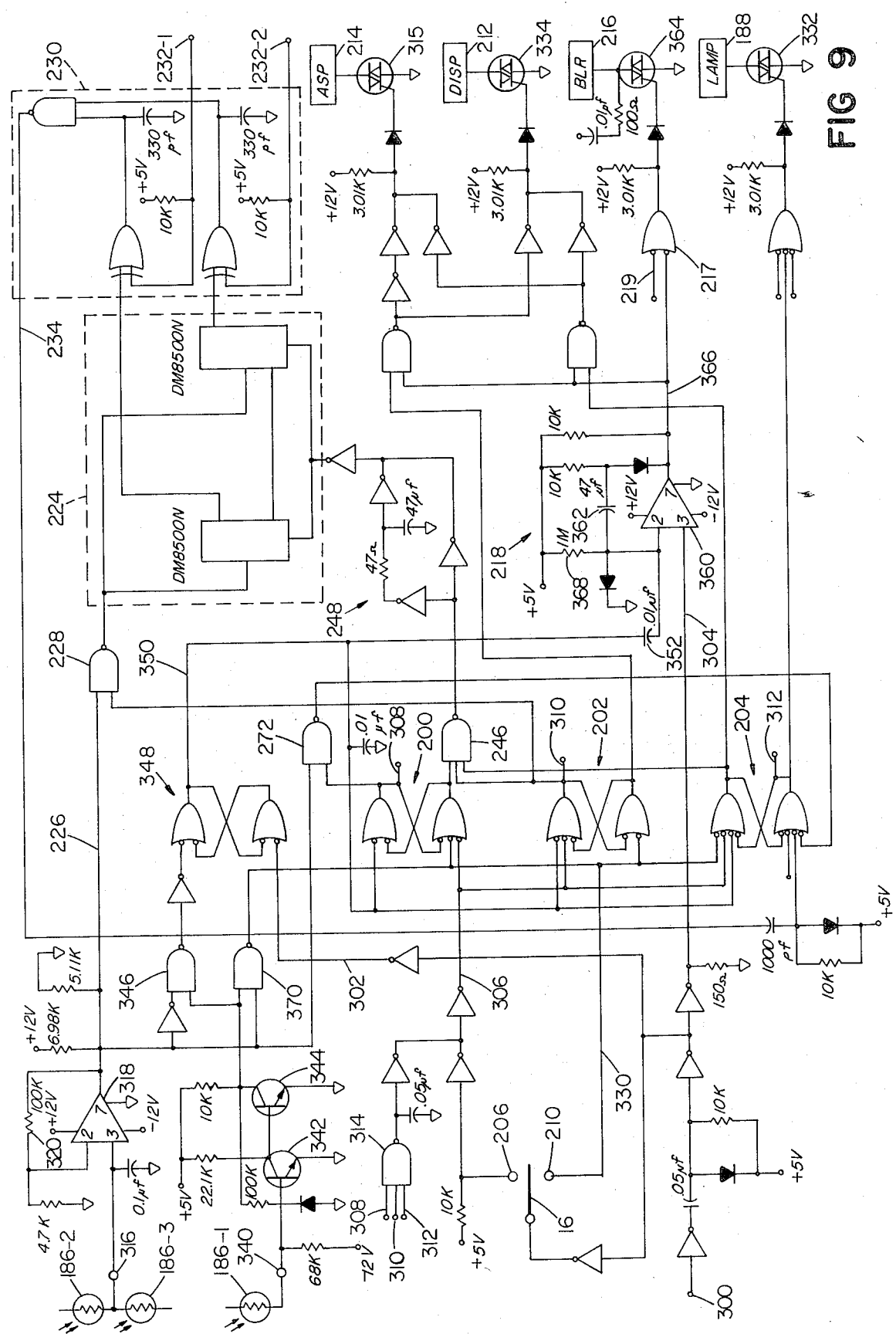
FIG. 9 is a schematic diagram showing details of the logic circuitry shown in FIG. 8.

Further details of the control logic may be seen with reference to FIG. 9, the principal components in that circuitry being designated with the same reference numerals as the corresponding components shown in FIG. 8. A synchronizing circuit controls the application of power to the motor windings 212, 214 and 216. A square wave signal at line frequency is applied at terminal 300 wherever a record card 30 is properly located in the card reader 20. With the card in, switch 16 and lines 302 and 304 are normally at +5 volts but are driven to ground at each zero crossing. Thus, when switch 16 is closed to terminal 206, an aspirate signal is applied over line 306 to clear flip flop 200 and set flip flops 202 and 204 (provided flip flop 200 is cleared (line 308), flip flop 202 is cleared (line 310), flip flop 204 is cleared (line 312) as indicated by logic circuit 314). This setting of these three flip flops is sensed by logic circuit 246 and a 100 microsecond reset pulse is applied to counter 224 by one shot 248. Also, the outputs of flip flops 202 and 204 are applied through the logic to energize triac 315 that controls the aspirate winding 214. The motor 56 commences rotation to move the flag from datum reference 178.

Sensing photocell 186-2 and reference photocell 186-3 are connected to terminal 316 and their output is applied to pin 3 of operational amplifier 318. The amplifier has feedback via resistor 320 from pin 7 to pin 2. As the sensing photocell senses a decreasing amount of light produced by mark 180-1, the voltage on pin 3 decreases and when pin 3 goes negative with respect to ground, the output (pin 7) switches and a positive 5 volt transition is applied on line 226 and triggers AND circuit 228 (conditioned by the output of the set flip flop 202) to apply a stepping pulse to counter 224. Pin 2 is at 0.25 volt in this state and pin 7 is switched when the voltage on pin 3 rises above 0.25 volt. This circuit thus provides waveform shaping with positive feedback due to resistor 320 so that the circuit switches at the same resistive value on the transition between the light value and the dark value sensed by cell 186-2. When the counter output is the same as the signals applied at terminals 232-1 and 232-2 from the card reader 20, compare logic 230 produces an output over line 234 to clear flip flop 202, de-energizing the aspirator winding 214 and also the indicator lamp 188. In this condition, the quantity specified by the card in the card reader in this embodiment 25, 50, 100 or 200 micrometers has been aspirated into sample tip 46 for subsequent dispensing. Logic 314 provides an interlock to prevent an erroneous aspiration operation.

To dispense, switch 16 is placed in contact with terminal 210. When the synchronizing circuit input is at ground, an enabling signal is applied on line 330 to clear flip flop 200 and 202 and set flip flop 204. The set flip flop 204 energizes triac 332 to energize lamp 188 and via the control logic energizes triac 334 to energize the dispense winding 212 of motor 56. The plunger 48 is driven downwardly until the lower travel limit 174 is sensed, the counter 224 not being stepped as the conditioning signal is removed from AND logic 228 by the cleared flip flop 202. The output of photocell 186-1 is applied to terminal 340 and amplified by transitors 342, 344. As the sensing photocell 186-2 is blocked from light a negative signal is on pin 7 of the operational amplifier 318 and a conditioning level is applied to AND circuit 346 to set flip flop 348 and produce an output on line 350 which sets flip flops 200, 202 and 204. When terminal 300 is at ground, flip flop 348 is cleared and the resulting transition on line 340 is coupled by capacitor 352 to one shot circuit 218. Pin 2 of operational amplifier 360 is clamped at +0.6 volts and capacitor 362 has a charge of +4.4 volts on it. The lower travel limit signal coupled by capacitor 352 applies a 5-volt negative spike to pin 2 and pin 3 goes from +100 millivolts to ground at the zero crossing switching the output (pin 7) from ground to +5 volts which triggers triac 364 to energize blower motor 216 but inhibits energization of aspirate winding 214. This output level on line 366 is of 2 seconds duration as controlled by time constant of capacitor 362 and resistor 368. The operational amplifier 360 is switched at the next zero crossing to turn off the blower motor 216 and to energize the aspirate winding 214 under the control of flip flops 202 and 204. Counter 224 is not reset as the flip flop 200 is set at this time. When the operational amplifier 318 senses the datum reference 178 (at the light to dark transition), an output is applied to conditioned AND circuit 272 and the resulting output clears flip flop 204 and turns off the motor 56.

If for some reason the upper travel limit 176 should be reached, AND circuit 370 will have an output which automatically sets the flip flops 200, 202 and 204 to dispense mode condition and the system is automatically recycled to discharge material from the sample chamber 46 and reset the dispenser for plunger 48 to the datum 178.

In a specific example of use of this dispenser system in a biochemical analysis for serum glucose, all three cuvette chambers 36 initially contain 4 milliliters of liquid reagent (6 percent orthotoluidiene in glacial acetic acid) when it is received by the user together with a corresponding ("glucose") data card 30. With the data card positioned in card reader 20, the card reader has an output over lines 252 to compare circuit 212. A glucose serum standard (containing a precisely determined 200 milligrams per 100 milliliters and coordinated with the glucose data card 30) is placed beneath the sample tip 46-1 and the control 16-1 is moved to the aspirate position so that 100 microliters (mark 180-3) of the standard is placed in the sample chamber 46-1. The same amount (100 microliters) of a sample of the serum to be analyzed is similarly placed in the chamber of dispenser 14-2 through operation of control 16-2. The cuvette 24 is then positioned so that chambers 36-2 and 36-3 are aligned with dispensing chambers 46-1 and 46-2, respectively, and then both controls 16-1 and 16-2 are moved to dispense position to discharge the samples into chambers 36-2 and 36-3. Nothing is added to chamber 36-1. After the chambers have been resealed and the contents mixed by inversion, the cuvette assembly 24 is placed in a unit of the incubator 18 and incubated at 100°C for 20 minutes. When the incubation period is complete, the cuvette 24 is placed in the photometric recess 22, the photometer being set in accordance with data on the associated glucose data card 30, and a photometric analysis of the materials in the three chambers 36 is made. The output digital value displayed at display 26 is directly proportional to the concentration of glucose in the sample serum in units of milligrams per 100 milliliters.

Thus, the invention provides convenient and versatile system for accurately dispensing material. It is particularly useful in conjunction with the performance of analyses of blood and other body fluids. The system is easily operated by untrained personnel and enables analytical information to be made available, quickly, accurately and inexpensively.

While a particular embodiment of the invention has been shown and described, various modifications thereof will be apparent to those skilled in the art, and therefore it is not intended that the invention be limited to the disclosed embodiment or to details thereof and departures may be made therefrom within the spirit and scope of the invention as defined in the claims.

What is claimed is:

1. A dispenser system for introducing a precise amount of a material to be analyzed into a container comprising:

a sample chamber, said sample chamber having a port through which material may be introduced into said chamber, apparatus for storing material in said chamber comprising a housing connected to said sample chamber, a movable member coupled to said housing, means to move said member relative to said chamber from a first position to a second position to introduce material into said chamber through said port, means for generating a series of quantity signals as a function of the movement of said member, a data record associated with said container, means responsive to said data record and said quantity signals for controlling movement of said member from said first position to said second position to store a precise amount of material in said chamber, and means to transfer said precise amount of material from said chamber to said container for analysis.

2. The system as claimed in claim 1 wherein said quantity signal generating means includes a flag member coupled to and movable with said movable member, and means for sensing said flag member and producing output signals as a function of the movement of said flag member, and said member movement control means includes means for comparing said output signals with said data record for controlling movement of said movable member from said first position to said second position.

3. The system as claimed in claim 2 wherein said flag member includes regions of different optical characteristics and said flag member sensing means includes photoelectric means for sensing said regions and producing said output signals as a function thereof.

4. The system as claimed in claim 3 wherein said flag member includes a transparent substrate and said regions are defined by opaque material on said substrate.

5. The system as claimed in claim 3 wherein said photoelectric means includes a light source, a sensing photocell and a cooperating reference photocell, said regions of different optical characteristics being interposed between said light source and said sensing photocell and said reference photocell being disposed for uninterrupted viewing of said light source.

6. The system as claimed in claim 1 wherein said member movement control means includes a counter responsive to said quantity signals, and, compare circuitry responsive to said counter and said data record for stopping movement of said movable member upon detection of a predetermined relation between data on said record and said counter.

7. The system as claimed in claim 1 wherein said member is movable from said second position beyond said first position to dispense material from said chamber, and further including travel limit structure for generating a limit signal when said member has moved a predetermined distance beyond said first position, and means responsive to said limit signal to reverse the direction of movement of said member to return said member to said first position.

8. A dispenser system for introducing a precise amount of a material to be analyzed into a container comprising:

a sample chamber, said sample chamber having a port through which material may be introduced into said chamber, apparatus for storing material in said chamber comprising a housing connected to said sample chamber, a movable member coupled to said housing, a drive to move said movable member relative to said chamber from a first position to a second position to introduce material into said chamber through said port, a flag member having a series of regions of alternating optical characteristics, photoelectric means for sensing said regions, means to produce relative movement of said flag member and said photoelectric means as a function of movement of said movable member, a counter, means coupled between said photoelectric means and said counter for generating a counter stepping signal on each sensed predetermined optical value at the transition between adjacent ones of said regions, a data record reader for generating data signals as a function of data on a data record sensed by said data record reader, compare circuitry responsive to said counter and data signals generated by said data record reader for stopping movement of said member upon detection of a predetermined relation between said data signals and said counter to store a precise amount of material in said chamber, and means to transfer said precise amount of material from said chamber to said container for analysis.

9. The system as claimed in claim 8 wherein said flag member includes a transparent substrate, said regions are defined by opaque material on said substrate and said photoelectric means includes a light source, a sensing photocell and a cooperating reference photocell, said opaque material being interposed between said light source and said sensing photocell and said reference photocell being disposed for uninterrupted viewing of said light source.

10. The system as claimed in claim 8 wherein said drive is reversible, and further including actuator means to control said drive, and inhibit means for disabling said actuator means when said movable member is moving from said first position toward a second position.

11. The system as claimed in claim 10 wherein said drive is an electric motor and further including synchronizing control coupled to said actuator means to energize electric motor in synchronism with the zero crossings of the alternating current power for said motor.

12. The system as claimed in claim 11 wherein said housing has a bore in it and said movable member is mounted in said bore for reciprocating movement.

13. The system as claimed in claim 8 wherein said counter is responsive to said signals from said sensing and reference photocells, said flag member further includes upper and lower travel limit portions and further including a limit sensor for sensing said travel limit portions, and means responsive to detection of one of said travel limit portions by said limit sensor to automatically change the direction of movement of said movable member.

14. The system as claimed in claim 13 wherein said material transfer means includes a blower, means to connect said blower to said chamber, and means responsive to detection by said limit sensor of a second travel limit portion to actuate said blower for a perdetermined interval of time and then to reverse the direction of movement of said movable member to return said movable member to said first position.

* * * * *

UNITED STATES PATENT OFFICE
CERTIFICATE OF CORRECTION

Patent No. 3,796,239  Dated March 12, 1974

Inventor(s) Jerrold Zindler and Norman F.F.J. Rolfe

It is certified that error appears in the above-identified patent and that said Letters Patent are hereby corrected as shown below:

Column 10, line 46, change the dependency of claim 13 from claim 9 to claim 8;
line 59, "perde-" should be --prede---.

Signed and sealed this 9th day of July 1974.

(SEAL)
Attest:

McCOY M. GIBSON, JR.
Attesting Officer

C. MARSHALL DANN
Commissioner of Patents